May 23, 1967

R. J. McCARTHY ETAL 3,321,690

RECHARGEABLE BATTERY ASSEMBLY WITH REVERSE
POLARITY CHARGE PROTECTION

Filed Oct. 19, 1964

INVENTORS
ROBERT J. McCARTHY
ILYITCH JACOB SOBEL
BY
OSTROLENK, FABER, GERB & SOFFEN
ATTORNEYS

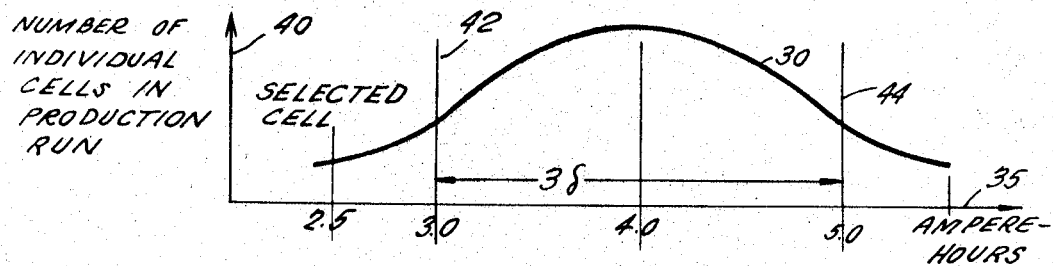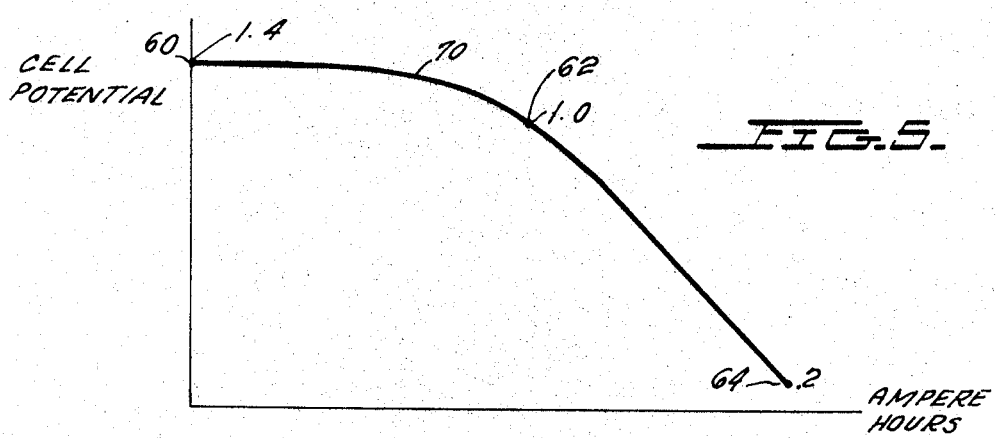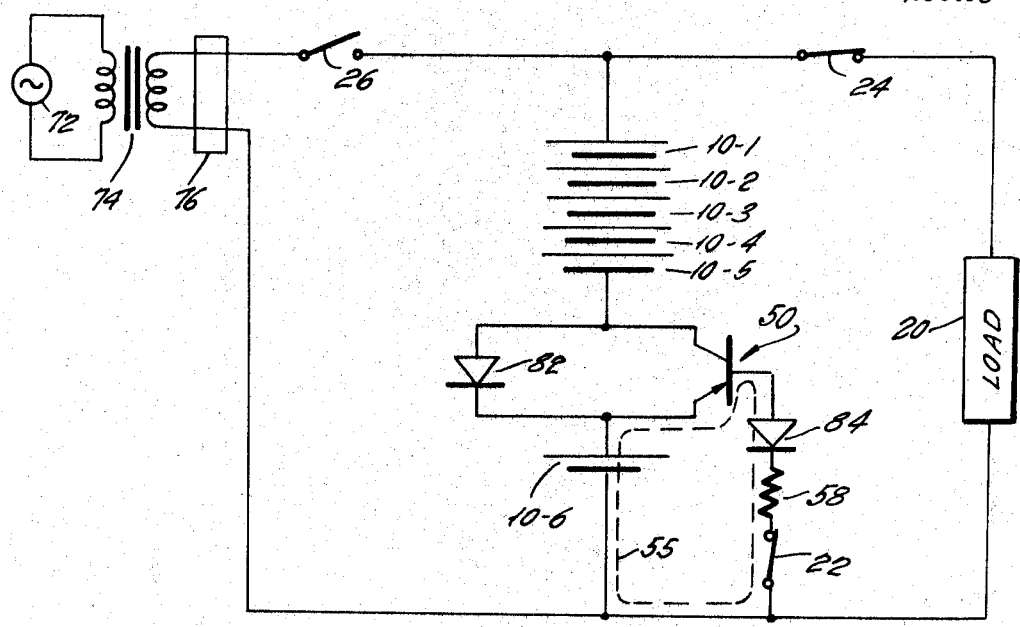

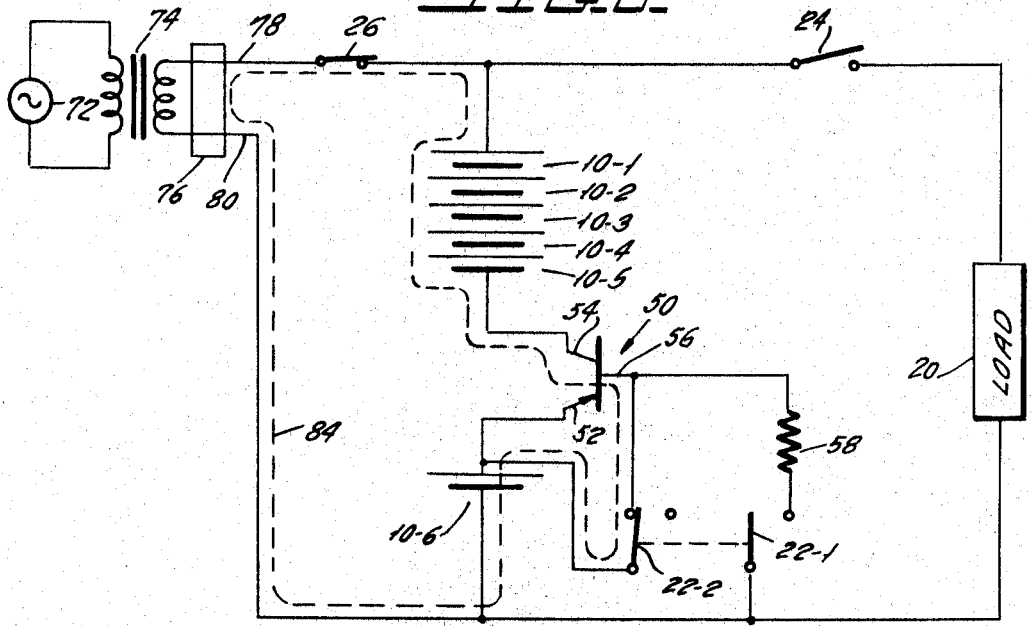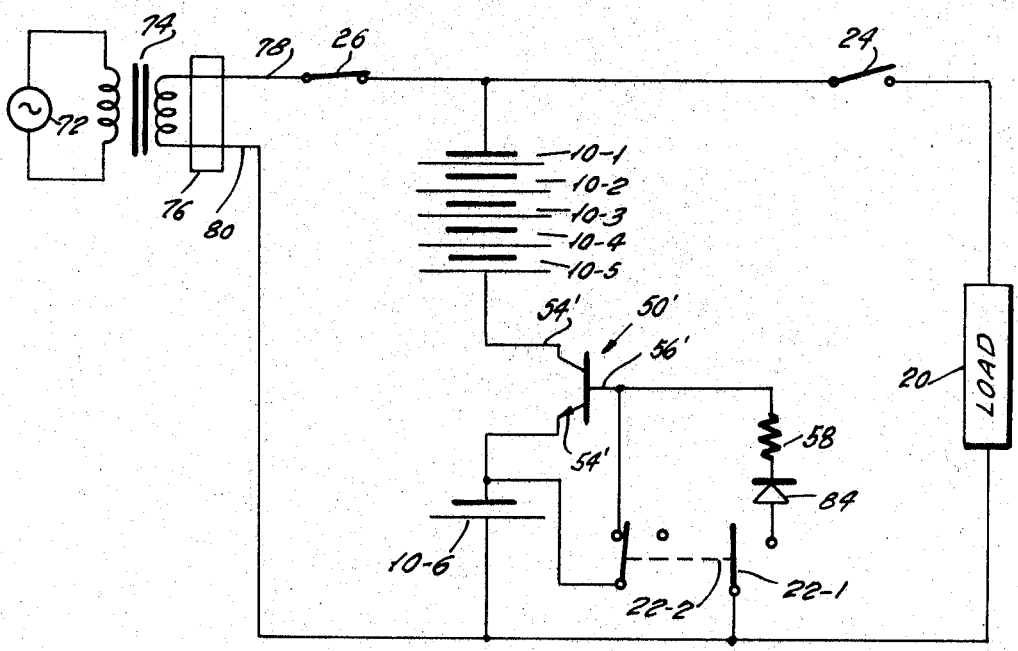

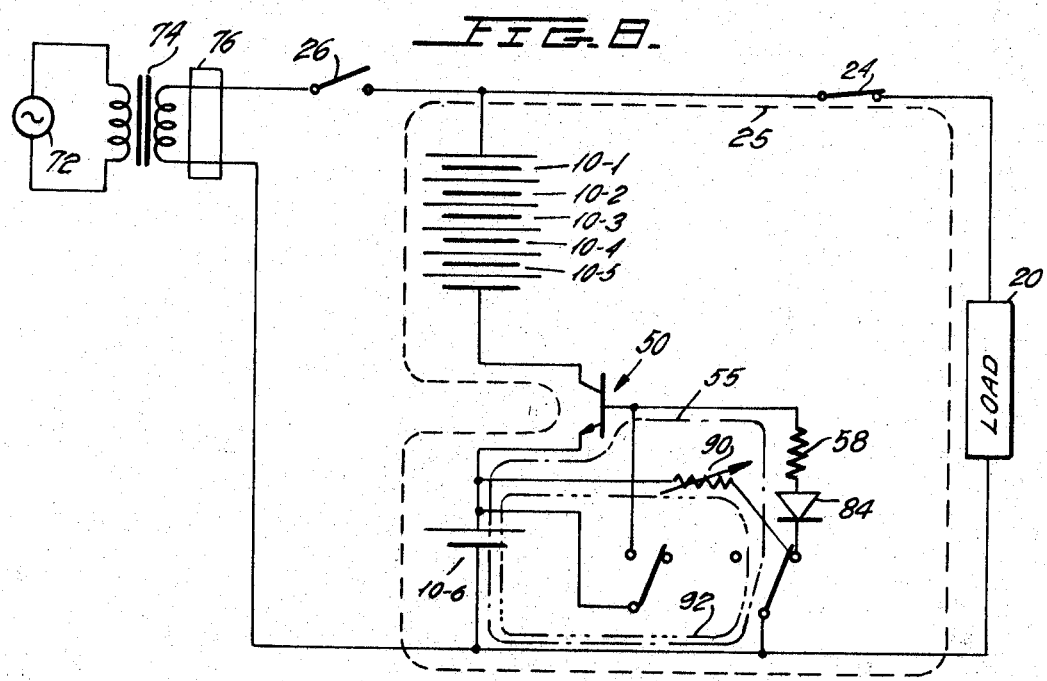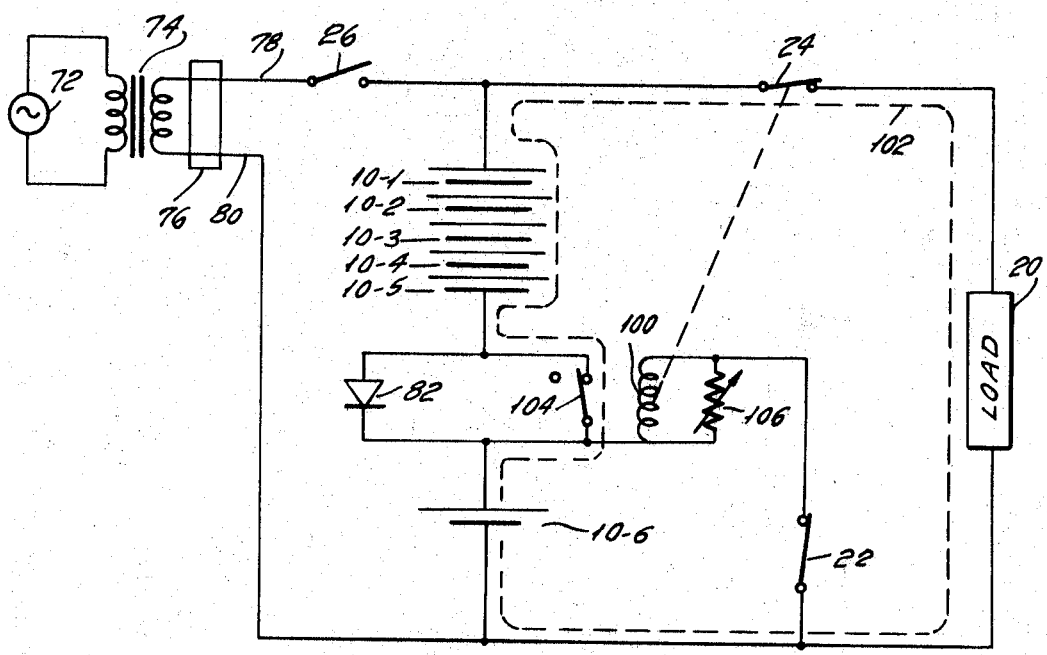

3,321,690
RECHARGEABLE BATTERY ASSEMBLY WITH REVERSE POLARITY CHARGE PROTECTION

Robert J. McCarthy, Goldensbridge, and Ilyitch Jacob Sobel, White Plains, N.Y., assignors to Sonotone Corporation, Elmsford, N.Y., a corporation of New York
Filed Oct. 19, 1964, Ser. No. 404,763
19 Claims. (Cl. 320—6)

Our invention relates to an assembly of sealed rechargeable battery cells and more particularly to improved circuit arrangements for preventing the discharge of the cells into a reverse polarity condition.

A battery assembly is generally formed of a plurality of individual cell units, series connected together. The cell units, when connected to an external load, undergo a conversion of their stored chemical energy into electrical energy. In the rechargeable type unit this energy conversion process may be reversed. That is, the chemical storage capacity of the unit, when depleted, is capable of regeneration through the application of an external electrical source. Such rechargeable cells are well known and are generally summarized in copending U.S. patent application entitled, "Third-Electrode Rechargeable Alkaline Battery Cells and Associated Battery Circuits," filed June 8, 1964, Ser. No. 373,216, in the name of David Yehiely and assigned to the assignee of the instant invention.

In rechargeable battery assemblies comprised of such a plurality of series connected individual cell units, the capacity of the individual cells, although theoretically identical, will in actuality, differ from one cell to another. When such an assembled battery unit is discharged into an external load, the cell of lowest charge capacity will tend to reach the completely discharged conditions, while the other cell units still contain sufficient charge to produce a discharge current. By virtue of the fact that these cells are connected in series, the higher charged capacity cells will then tend to push electrical current through the depleted lower capacity cell, thus driving the lower capacity cell beyond the zero voltage condition and into a reverse polarity condition. The tendency of individual sealed cells to approach such a reverse polarity condition has long been recognized as presenting a critical problem. As, for example, in the case of sealed nickel-cadmium cells, after the discharge has converted or oxidized all of its positive electrode mass of nickel (II) hydroxide $NI(OH)_2$ into nickel (III) hydroxide [with the negative electrode still containing unreduced cadmium (II) hydroxide $Cd(OH)_2$], further over-discharge or reverse charging current through such lowest capacity cells causes it to evolve hydrogen gas. This hydrogen gas does not tend to easily recombine within the sealed casing upon subsequent charging and discharging of the cell. Hence, the repetitive cyclic operation of the battery assembly tends to successively build up the hydrogen gas within the sealed unit. The evolution of such hydrogen gas by driving the cell units into a reverse polarity condition is a dangerous situation which should be avoided.

Previously attempted techniques for overcoming the difficulties caused by the evolution of such gases are described in U.S. Pats. Nos. 1,016,874 (Edison); 2,104,973 (Dassler); and 3,080,440 (Ruteschi et al.). Those patents show the utilization of an auxiliary third cell electrode having platinum or platinum sponge exposed to gases within the sealed cell casing.

In order to be effective, the platinum of the third cell electrode must be protected against exposure to electrolyte with a gas pervious antiwetting agent or coating, for instance, of polytetrafluoroethylene (Teflon-type) or perfluorodecanoic acid, or analagous antiwetting compounds of the type described in the articles published in Journal of Colloid Science, vol. 7, October 1952, pages 465–481, by F. Schulman and W. A. Zisman, and Industria and Engineering Chemistry vol. 41, July 1959, pages 829, 830, by D. R. Baer.

In the printed Extended Abstracts, vol. 8, of the Battery Division of the Electrochemical Society, Inc., of the papers presented at the Fall Meeting, September 30, 1963, the Abstract No. 10, pages 32, 33, W. N. Carson, Jr., and J. M. McQuade describe the use of the voltage developed between such waterproofed gas-exposed third platinum electrode and the negative electrode of a sealed nickel-cadmium or silver battery cell for stopping overcharge thereof. However, such third electrode of a sealed rechargeable cell does not develop a voltage that would be helpful in stopping or suppressing reverse or overdischarging of a sealed cell and the resulting evolution of hydrogen gas in the sealed cell casing.

A more advantageous arrangement is the subject of above-discussed U.S. patent application Ser. No. 373,216 wherein a rechargeable alkaline batery cell includes a third auxiliary electrode, which in conjunction with another cell electrode and associated control circuit means responds to reverse charging or over-discharge of the cell, to cut off reverse current charging. Although effective in protecting the rechargeable battery assembly from the adverse affect of reverse polarity, that arrangement disadvantageously requires the inclusion of a control cell unit modified to have the additional third electrode. Our invention constitutes a significant improvement thereover by permitting the utilization of a standard type cell unit, appropriately monitored in a simple and inexpensive manner, to sense the approaching of the reverse polarity condition.

More specifically, our invention contemplates forming the rechargeable battery assembly of a plurality of individual cell units, one of which is predeterminedly selected to approach the reverse polarity condition before any of the other of said cells. The selection of such a cell unit may be accomplished by either preselecting a cell of known lesser charge capacity or providing a more rapid rate of discharge for the selected cell. Considering the former, it is statistically known that substantially all the cell units of a normal production run will lie within a standard deviation from the norm value. By selecting a cell measured to have a charge capacity beyond the known normal deviation, at the low end, of the production lot, such a cell will statistically have an assured lower capacity as compared to the other cells, selecting at random from the production lot and comprising the remainder of the series connected rechargeable battery assembly. In the latter method of selection, the monitoring cell could be one of the standard production cells (within the normal deviation range of charge capacity), but have an auxiliary discharge path circuit connected across its terminals. The magnitude of auxiliary discharge is operatively related to the known load discharge, such that the selected cell will approach its reverse charging condition prior to any of the other series connected cells approaching this condition.

A simplified circuit means is then placed across the terminals of the predeterminedly selected cell to sense when it approaches its reverse polarity condition. Naturally, this will occur before any of the other cells approach reverse polarity. The sensing means may, in the preferred form contemplated by our invention, be a transistor connected to operate as a switch. Namely, the base and emitter terminals of the transistor are connected across the anode and cathode terminals of the cell unit to be monitored. The overall discharge path of the battery assembly series of cell units includes the collector-to-emitter terminals of the same transistor. The energy for base current biasing of the transistor is provided by the selected cell. Appreciable base current will flow corresponding to that cell being in an appreciable positive polarity condition, with the emitter-to-collector terminals of the transistor being base current biased into a forward conducting condition. As the selected cell dissipates its charge, its potential will rapidly drop as it approaches a reverse polarity condition. This correspondingly reduces the base current magnitude, resulting in switching the emitter-to-collector junction of the transistor into a blocking or cut-off condition. The switching of the transistor to its cut-off condition serves as an interrupting means in the discharge current path of all the cell units to the external load. Advantageously, this cut-off condition is reached before actually requiring the selected cell to go into a reverse current condition. This absolutely prevents that cell, or any of the other series connected indiivdual cells forming the battery assembly, to actually enter a reverse polarity condition.

To more closely control the point at which the dissipating charged condition of the selected cell begins to appreciably lower the discharge current magnitude, a forwardly biased diode may be provided in series with the transistor base-to-emitter junction across the terminals of the selected cell. The potential drop of the selected cell will then be preselectably proportioned between the base-to-emitter junction of the switching transistor and the dropping diode member. Stated otherwise, by presenting only a portion of the selected cell potential drop to the base-to-emitter junction of the switching transistor, the base current will be reduced to a value corresponding to a significant cut-off condition of the transistor, before the selected cell potential actually reaches zero or very close to zero. This arrangement provides further protection of the monitoring cell or any of the cells of similar charged capacity from going into a reverse polarity condition.

As in alternative arrangement the potential of the selected cell may be applied to the energizing coil of an electromagnetic relay. The relay coil is selected to be energized by a potential corresponding to the selected cell being above a predetermined magnitude (with such magnitude corresponding to an appreciable charged condition of that cell). The energization of the relay coil controls a set of contacts to close the discharge current path. As the selected cell potential drops, corresponding to its approaching a dissipated or reverse polarity condition, it will no longer be able to maintain the relay coil in its energized condition. This will cause the opening of its associated set of contacts in the discharge current path, thereby interrupting the discharge of all of the individual cell units comprising the battery assembly and preventing any and all of such cells from going into a reverse polarity condition.

In order to permit the battery assembly to be charged, an external charging circuit of the conventional variety will be provided. A circuit means is preferably provided for by-passing the above-discussed reverse polarity condition sensing means during the charging operation. This bypass may, for example, take the form of a simple diode across the transistor or relay coil, appropriately biased to permit charging current but offering appreciable resistance to discharge current. Alternatively, in the embodiments of our invention utilizing a transistor as the sensing and switching element, the collector-to-base junction of the transistor may serve as the bypass circuit. If so, in the charging mode of operation, the collector-to-base junction of the transistor will be forward biased. Specifically, the transistor is circuit connected to the selected cell such that a conversion of the assembly to the charging mode of operation interrupts the base current bias path provided by the selected cell potential, with the collector-to-base junction being circuit connected in series with the battery assembly and charging source.

It is therefore seen that the basic concept of our invention resides in: predeterminedly selecting one cell of a plurality of cells forming a rechargeable battery assembly such that it approaches its reverse polarity condition before any of the other of the cells; sensing the condition of said selected cell in a simplified and inexpensive manner; and interrupting the discharge current path of all of the cells corresponding to the selected cell approaching a dissipated or reverse polarity condition.

It is accordingly a primary object of our invention to provide a rechargeable battery assembly having an improved protective arrangement for preventing the reversal of cell polarity.

Another object of our invention is to provide a rechargeable battery assembly including a cell of preselected lesser charge capacity than the other cells forming the battery assembly, and having simplified means for sensing the condition of that cell responsive to its approaching a reverse polarity condition and automatically interrupting the discharging of all the individual cell units.

A further object of our invention is to provide such a prechargeable battery assembly, wherein the potential of the preselected cell of lesser charge capacity is applied to a switching element for transferring said element between a first and second condition.

An additional object of our invention is to provide such a rechargeable battery assembly with reverse polarity protective means, wherein the switching element comprises a transistor and the preselected cell provides the base current bias of said transistor.

Still a further object of our invention is to provide such a rechargeable battery assembly with reverse polarity protective means wherein the switching element comprises a relay, the coil of which is energized by the cell of lesser charge capacity, with the relay controlling a pair of contacts for interrupting the discharge current path responsive to the potential of that cell falling below a predetermined magnitude.

Still another object of our invention is to provide a rechargeable battery assembly including a series connected plurality of individual cell units, one of the cell units being preselected to approach its reverse polarity condition before any of the other cell units, together with means for automatically sensing the approaching of that cell unit towards its reverse polarity condition and interrupting the discharge path of all of the series connected cells.

Still an additional object of our invention is to provide within a rechargeable sealed alkaline battery one cell having at least one positive electrode and a cooperating negative electrode of larger charge capacity, said one cell constituting one of a cell series comprising a plurality of similar series connected cells, all of which have greater positive charge capacity than the one cell, together with means for sensing the condition of the one cell when subjected to the approaching of a reverse polarity condition and automatically interrupting the discharging of the cell series responsive to the sensing of that condition.

These as well as other objects of our invention will readily become apparent upon a consideration of the following description and drawings wherein:

FIG. 1 is a circuit diagram showing one embodiment of our invention, utilizing a cell of predetermined lesser discharge capacity and sensing the approaching of said cell towards its reverse polarity condition by the simple expedient of a PNP transistor member operating as a base bias controlled switch.

FIG. 2 is a curve showing the well known Gaussian statistical distribution of individual units about their normal value.

FIG. 3 is the complement of FIG. 1 showing the use of an NPN transistor.

FIG. 4 corresponds to FIG. 1, but shows the addition of a diode member in the base current path of the transistor for controlling the transistor cut-off point.

FIG. 5 graphically shows the variation of cell potential with charge capacity.

FIG. 6 shows a further variation of our inventive technique wherein the collector-to-base junction of the transistor is utilized as the bypass portion of the charging current path.

FIG. 7 is the complement of FIG. 6 and shows the utilization of an NPN type transistor.

FIG. 8 shows a modification of the circuit of FIG. 6, wherein an additional discharge path is provided for the selected cell, operatively related to the discharge into the external load to insure that the selected cell approaches the reverse polarity condition prior to any of the other cells.

FIG. 9 shows an alternative embodiment of our invention, wherein the potential of the selected cell is applied to the energizing coil of a relay.

Referring initially to FIG. 1, the rechargeable battery assembly is formed of a number of individual cell units 10–1, 10–2, 10–3, 10–4, 10–5, and 10–6. The particular number of individual cells serially connnected in the overall rechargeable battery assembly is determined by the intended load application, in the well known manner.

The specific cells may be of the well known nickel cadmium type. The invention may also be utilized in conjunction with other types of rechargeable alkaline battery cells; for example, in nickel-iron rechargeable cells. This invention is likewise broadly applicable to sealed or partially sealed rechargeable nickel cadmium cells including by way of example those described in U.S. Pat. No. 3,083,249 (Belove), and in pending application Ser. No. 322,824, filed Nov. 12, 1963 (Bierdunpfel), now U.S. Patent No. 3,279,953, and in the metal encased and metal forced vent closure cell described in U.S. application Ser. No. 343,316, filed Feb. 7, 1964 (Vignini), the disclosures of which are herein relied upon to shorten the description of the distinguishing features of the present invention.

In accordance with our invention, a preselected one of the individual cell units, such as 10–6, is predeterminedly chosen such that when the series connected arrangement of cell units 10–1—10–6 simultaneously discharge into an external load 20, cell unit 10–6 will approach its zero and subsequently reverse polarity condition, before any of the other cells 10–1—10–5.

One way in which cell 10–6 may be selected is by application of the known statistical variation of individual production cell units within a normal production lot. In this respect, curve 30 of FIG. 2 represents the well known Gaussian distribution of anticipated values of individual cell units about their normal rating (e.g. 4.0 ampere-hours). Abscissa 35 indicates the charge capacity of such individual cell units and the ordinate 40 indicates the frequency distribution of such individual units within a typical production run. Repeated statistical samplings generally show that over 90% of the individual cell units lie within the three-delta range indicated by the vertical lines 42, 44, where delta indicates the statistically determined deviation factor. Considering this in terms of the particular value shown in FIG. 2, 90% of the individual cell units will, in most likelihood, have a charge capacity between 3.0 and 5.0 ampere-hours. By selecting cell 10–6 to have a charge capacity of for example 2.5 ampere hours, such a unit will lie well beyond the low end of the known normal deviation, and it can be reasonably certain that a unit will have a charge capacity less than any of the individual cells 10–1—10–5. In the unlikely event one of such cells 10–1—10–5 does have a charge capacity close to that of cell unit 10–6, our invention will still prevent such individual cell units from going into a reverse polarity condition, as will be subsequently discussed, in conjunction with FIG. 4.

Cells when standing for a period of time can lose up to 10% of their charge capacity. Hence, in the selection of cell 10–6, it is preferable that the charge capacity of such cell be at least 10% below the low end of the normal deviation. Advantageously cell 10–6 is well beyond this 10% variation, as for example 12% below the lowest cell within the three-delta range.

Referring back to FIG. 1, during discharge of the series connected cells 10–1—10–6 into load 20, switches 22 and 24, preferably ganged together, are both closed, with switch 26 open. Alternatively, when charging the battery cell nuit, switch 24 is opened, interrupting the circuit to the load; switch 22 is opened, interrupting the base current path of transistor 50; and switch 26 closed to complete the path to the external charging source. A transistor 50 of the PNP type, having an emitter terminal 52, collector terminal 54 and base terminal 56 is shown. Emitter terminal 52 is connected to the positive terminal of selected cell 10–6 with collector terminal 54 being connected to the negative terminal of the next adjacent series connected cell unit 10–5. Hence, the discharge current path shown by dot-dash arrows 25 includes the emitter-to-collector junction of transistor member 50.

The closing of switch 22 when the circuit operates in the discharge mode also connects the base terminal 56 of transistor 50 to the negative terminal of monitoring cell 10–6, preferably via a current limiting resistor 58. Thus, a base current transistor bias path will be provided as shown by arrows 55, with the cell 10–6 serving as the source of base current.

Reference is now made to FIG. 5, which typically shows the potential-versus-charge capacity curve 70 of an individual cell unit, such as cell 10–6. The cell unit may be considered to have a theoretical potential 1.4 volts, as shown by point 60, corresponding to the fully charged condition of battery cell unit 10–6. As the battery cell progressively discharges, the potential first experience a slow lowering of its terminal potential, as for example, to the 1.0 volt condition shown as point 62 of curve 70. As discharge of the battery cell unit progresses further, the lowering of the potential is more rapid as shown by the portion of curve 70 intermediate point 62 and point 64 wherein the battery cell has dropped to a potential 0.2 volt. Progressive discharge of the series connected cell units of greater charge capacity (such as 10–1—10–5) will ultimately tend to drive cell unit 10–6 of lesser charge capacity into a reverse polarity condition.

By sensing the point at which battery cell unit 10–6 approaches this condition (with such cell being of predetermined lesser charge capacity), it will be known that the other of the cells, such as 10–1—10–5 have not as yet reached this condition. Hence, by interrupting the discharge current path at a preselected point along the discharge curve 70 of cell unit 10–6, it is reasonably certain that the discharge current path 25 will thus be interrupted prior to any of the cells such as 10–1—10–5 approaching a reverse polarity condition.

In the embodiment shown in FIG. 1, the interruption of the discharge current path 25 is obtained by having the magnitude of base current 55 act as the bias for cutting off the emitter-to-collector junction path of transistor unit 50. That is, it is well known in transistor design that as the base current is reduced, it will act as a control member serving to block the emitter-to-collector path.

Considering specific values, a circuit as shown in FIG. 1 has been successfully demonstrated to operate, utilizing transistor 50 of the commercially available 2N554 type and a base current limiting resistor having a value of 4.7 hms. The table below illustrates the manner whereby the lowering of the voltage of the cell unit 10–6 serves to progressively bias the emitter-to-collector junction of transistor 50 into its blocking state to interrupt the discharge current path.

| Voltage of cell 10–6 (volts): | Discharge current of path 25 (amps) |
|---|---|
| 1.2 | 1.05 |
| 1.17 | 1.03 |

| Voltage of cell 10–6: | Discharge current of path 25 (amps.) |
|---|---|
| 1.0 | 1.00 |
| .50 | .640 |
| .32 | .440 |
| .29 | .135 |
| .20 | .086 |

Note that this condition becomes remarkably more progressive during the appreciable discharge condition intermediate points 62 and 64, as shown in curve 70 of FIG. 5. This corresponds to the rapid approaching of the cell unit towards its dissipated condition, and it is particularly desired that the interruption of the discharge current proceed at a rapidly progressive rate. Hence, the emitter-to-collector junction of transistor 50 may be analogized to an interrupting means, the control of such interrupting means being provided by the switching of the transistor 50 from an appreciable conducting to a blocking state, as determined by the magnitude of base current provided by the monitoring cell 10–6 of predetermined lesser charge capacity.

The numerical values given in the table shown above are merely for illustrative purposes only, and in no way are intended to limit the application or scope of the subject invention. Various transistor types may be employed having the appropriate parameters as determined by the particular requirements of its intended application. For example, the transistor selected must be capable of safely handling the expected discharge current into the load. This necessitates a consideration of its currently carrying capabilities and its wattage ratings. Further, it must have the desired gain alpha, maximum current $I_c$ and a small leakage current $I_{co}$. Should an appreciable leakage current be available, the transistor will be capable of conducting through its emitter-to-collector terminals, with the base being cut off. The transistor unit selected should also have a low saturation resistance to provide a minimum wattage loss in the transistor itself during the discharge period.

When it is desired to charge the series connected cell units 10–1—10–6, the switches 22, 24, 26 are connected as follows: Switch 22 is opened thereby opening the base current path of transistor unit 50; switch 24 is opened thereby opening the discharge current path to the load 20; switch 26 is closed thereby completing the charging current path to the series connected cells 10–1—10–6. The charging current is provided by a conventional alternating current source 72 connected through a power transformer 74. Power transformer 74 is connected to a rectifier and constant current supply circuit 76, for supplying, through its positive and negative supply leads 78, 80, a constant charging current for recharging all the cells of the battery assembly. A uni-junction circuit element such as diode 82 is shunt connected across the emitter and collector terminals of switching transistor 50. Diode 82 is forward biased by the charging current source, so as to permit current flow therethrough in the direction corresponding to charge, as shown by the arrows 84. With switch 26 closed, the charging of series connected cells 10–1—10–6 continues for an appropriate duration of time to restore their previously dissipated charge capacity.

Reference is now made to FIG. 3, which corresponds to FIG. 1, but shows the complementary circuit utilizing an NPN type transistor unit 50' instead of the PNP transistor type unit 50 shown in FIG. 1. Circuit elements corresponding to those shown in FIG. 1 are indicated by like numerals. NPN transistor unit 50' may, for example, be the commercially available 2N1016 type, with it being understood that numerous other transistor types may be utilized in conjunction with our invention. The polarity connection of cell units 10–1 through 10–5 are reversed, as is diode 82. The poistive terminal of battery unit 10–5 is now connected to the collector terminal 54' of transistor unit 50'. Similarly, the negative terminal of cell 10–6 of predetermined leser charge capacity is connected to the emitter terminal 52' of transistor switching element 50', with the positive terminal of said cell 10–6 being connected to the transistor base terminal 56' via switch 22 and base limiting resistor 58. The operation of the complementary configuration shown in FIG. 3 corresponds to that above-discussed in FIG. 1, and it is not believed that a detailed discussion thereof is necessary.

Reference is now made to FIG. 4, which shows a modification of the basic circuit shown in FIG. 1, to include a forwardly biased diode member 84 within the base current path 55 of transistor member 50. As in FIG. 3, those portions of the circuit corresponding to that shown and discussed in conjunction with FIG. 1 are designated by like numerals.

The purpose of additional diode member 84 may best be understood by considering the distribution of the potential provided by cell 10–6, as shown by the following equation.

$$E_{10.6} = E_{eb} + E_{84} + E_{58}$$

or $E_{10.6}$=the base current source potential provided by the cell unit 10–6

$E_{eb}$=the potential across the emitter-to-base junction of the transistor 50

$E_{84}$=the voltage drop in the forward direction across the diode member 84

$E_{58}$=the voltage drop across current limiting resistor 58 (preferably small)

Thus, only a predetermined portion of the voltage provided by $E_{10.6}$ will appear across the emitter-to-base junction of transistor switching element 50. Considered otherwise, the point at which the potential of 10.6 is sufficiently lowered to appreciably lessen the discharge current through load 20 will now be at a higher potential point along curve 70 of FIG. 5. That is, the collector-to-emitter junction, which serves as the interrupting means of the discharge current path 25 will now cut off at an earlier discharged condition of cell 10.6. Considering specific values should the diode 84 have a 0.2 voltage drop in its forward condition, a potential of 0.5 volt of cell 10.6 will essentially correspond to a similar potential of 0.3 volt in the arrangement shown in FIG. 1. Hence, whereas the FIG. 1 arrangement would require the cell unit 10–6 to approach a discharge condition corresponding to such an extremely low potential in order to appreciably cut off the discharge current through the emitter-to-collector junction of transistor 50, the inclusion of diode 84 in the base current path permits such appreciable cut-off of the discharge current path at a correspondingly higher potential of discharge cell 10–6. This advantageously serves to insure that control cell 10–6 will not actually enter its reverse polarity condition. Further, should any of the cells 10–1—10–5 have a charge potential close to that of cell 10.6, by raising the control cut-off point, this serves to further insure that none of such cells 10–1—10–5 will likewise approach or actually enter a reverse polarity condition.

Reference is now made to FIG. 6 which shows a further modification of the general circuit arrangement shown in FIG. 1, but utilizing the collector-to-base junction, forward biased in the charging mode of operation. As shown in the charging condition of FIG. 6, the charging current path 84 flows from terminal 78 of the charging current source through series connected cells 10–1—10–5; the collector-to-base junction of transistor unit 50; switch contacts 22–2 and cell 10–6, returning to terminal 80 of the charging source. As shown, the charging source will forward bias the collector-to-base junction, so as to permit the flow therethrough of charging current, thereby avoiding the utilization of a shunt diode member 82, as shown in FIGS. 1, 3 and 4. When operating the circuit of FIG. 6 in its discharged condition, switches 22–1, 22–2, ganged together, are moved to their alternative position, switch 26 is opened and switch 24 is closed. Switch 22–1 serves to complete the base current path through the emitter-to-base junction of transistor unit 50, and current limiting resistor 58 across cell unit 10–6. The opening of switch section 22–2 defeats the portion of the charging current path from the collector-to-base junction of transistor 50 to the positive terminal of cell unit 10–6. Hence, ganged switch contacts 22–1, 22–2 permit conversion of the transistor member 50 as either a switching element to sense the condition of test cell 10–6 and interrupt the discharge current corresponding to that cell approaching a predetermined discharge state; or as a uni-junction circuit element to permit the series charging of the rechargeable battery assembly.

FIG. 7 corresponds essentially to FIG. 6, but shows the NPN complementary configuration utilizing transistor circuit member 50′. Also a diode member 84 is included in the base current discharge path for causing the collector-to-base junction of transistor unit 50′ to cut off at a higher potential of cell unit 10–6 than would otherwise be provided, as above discussed in conjunction with the embodiment of FIG. 4. It should naturally be understood that the embodiments of FIGS. 6 and 7 may each be provided with or without diode member 84. The forward voltage drop of such a diode member 84 is operatively related to the transistor 50 characteristics and the discharge curve of the cell 10–6 to provide maximum safe discharge of the series connected cells 10–1—10–6, which assuring that none of said cells are driven a reverse polarity condition.

Reference is now made to FIG. 8, which shows a further modification of the general arrangement shown in FIG. 6, having base diode member 84 and showing a further additional resistor 90. The circuit of FIG. 8 is shown in the discharge condition wherein the main discharge current path 25 flows through the emitter-to-collector junction of transistor 50, and the base current 55 is provided by cell unit 10–6. Resistor 90 provides an additional discharge path of cell unit 10–6 as shown by 92. This arrangement is particularly advantageous wherein the drain of load 22 is shown. Also, resistor 90 may be adjusted such that the additional current drain provided thereby for cell unit 10–6 assures that cell unit 10–6 will discharge towards its reverse polarity condition prior to any of the cell units 10–1—10–5. This arrangemnt is particularly advantageous since it does not require the measured selection of cell unit 10–6, having a known lesser charge capacity below the known normal deviation of the production run (as discussed above in conjunction with FIG. 2). By selecting any cell at random and measurably adjusting resistor 90 in conjunction with the known load drain, such a normal cell unit 10–6 may be utilized as the monitoring cell, with it being assured that such monitoring cell will approach its reverse polarity condition before any of the other cells 10–1—10–5.

Reference is now made to an alternative embodiment of our invention, shown in FIG. 9, wherein the potential of cell 10–6 of predetermined lesser charge capacity is monitored by a relay coil 100. Relay coil 100 in turn controls normally opened contacts 24. With switch 22 being closed, corresponding to the discharge mode of operation, the discharge current path indicated by arrows 102 flows through series connected cell units 10–1—10–5; switch 24; load 20; cell 10–6; and shunt contact 104. The voltage drop across cell 10–6 is applied to the relay coil 100, with there preferably being an adjustable resistor 106 in shunt across coil 100 to adjust the current drain of that path. Adjustable resistor 106 in relay coil 100 is so selected such that as long as cell unit 10–6 maintains a potential corresponding to an appreciable charge condition thereof, relay coil 100 will be energized. However, as test cell 10–6 approaches its discharged or reverse polarity condition, with the attendant decrease of potential thereacross, a predetermined point will be reached at which the potential of test cell 10–6 is insufficient to hold relay coil 100. This results in contact 24, operated thereby, to open, automatically opening the discharge current path 102 of the series connected cell units.

Charging of the series connected cell units shown in FIG. 9 is provided by closing switch 26 and opening switch contacts 104, thereby permitting uni-directional diode member 82 to complete the series charging circuit to terminals 78, 80 of the charging source.

It is therefore seen that the basic concept of our invention resides in providing within a series of cell units comprising a rechargeable battery assembly, one cell predeterminedly selected to approach its reverse polarity condition prior to the other of said cells, and monitoring that cell with a switching element of simpliled and inexpensive construction to automatically sense the approaching of the reverse polarity condition of said one cell and interrupting the discharge current path of all of the cells responsive thereto.

Although there has been described preferred embodiments of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A rechargeable battery assembly comprising:
  a plurality of individual cells, electrically connected together to combinedly discharge into an external circuit;
  individual ones of said cells having a positive and cooperating negative electrode, with said negative electrode having a greater charge capacity than said positive electrode;
  said cells being subject to charging with reverse polarity in response to full discharge of said positive electrode by discharging current;
  one of said cells predeterminedly selected to approach said reverse polarity condition before any of the other of said cells;
  said one cell having a first condition corresponding to an appreciable positive charge;
  and a second condition corresponding to the approaching of said reverse polarity condition;
  means for sensing the condition of said one cell and interrupting the discharging of all of said cells respective to said one cell being in said second condition.

2. A rechargeable battery assembly comprising:
  a plurality of individual cells, electrically connected together to combinedly discharge into an external circuit;
  individual ones of said cells having a positive and cooperating negative electrode, with said negative electrode having a greater charge capacity than said positive electrode;
  said cells being subject to charging with reverse polarity in response to full discharge of said positive electrode by discharging current;
  one of said cells preselected to have a lesser charge capacity than any of the other of said plurality of cells;
  said one cell having a first condition corresponding to an appreciable positive charge;
  and a second condition corresponding to the approaching of said reverse polarity condition;
  means for sensing the condition of said one cell and interrupting the discharging of all of said cells responsive to said one cell being in said second condition.

3. A rechargeable battery assembly comprising:
  a plurality of individual cells, electrically connected together to combinedly discharge into an external circuit;
  individual ones of said cells having a positive and cooperating negative electrode, with said negative electrode having a greater charge capacity than said positive electrode;
said cells being subject to charging with reverse polarity in response to full discharge of said positive electrode by discharging current;
one of said cells predeterminedly selected to approach said reverse polarity condition before any of the other of said cells;
said one cell having a first condition corresponding to an appreciable positive charge;
and a second condition corresponding to the approaching of said reverse polarity condition;
a switching element having a first terminal electrically connected to the positive electrode of said one cell, and a second terminal electrically connected to the negative electrode of said one cell;
said one cell, when in said first condition, presenting a positive potential, above a predetermined magnitude, between said first and second terminals;
said one cell, when in said second condition, presenting a lesser potential between said first and second terminals;
said switching element having a first state as determined by the potential to said first and second terminals being above said predetermined magnitude, and corresponding to said one cell being in said first condition;
and a second state as determined by said potential being at said lesser value, and corresponding to said one cell being in said second condition;
said switching element including interrupting means circuit connected in the discharge current path of said plurality of cells, for interrupting said discharge current flow responsive to the switching of said switching element to said second state;
whereby the discharge of all of said plurality of cells is interrupted responsive to said one cell approaching its reverse polarity condition.

4. A rechargeable battery assembly as set forth in claim 3, wherein:
said switching element comprising a relay, the energizing coil of which includes said first and second terminals, said one cell furnishing the excitation source of said energizing coil;
said interrupting means comprising at least one pair of contacts controlled by said energizing coil.

5. A rechargeable battery assembly as set forth in claim 3, wherein:
said switching element comprises a transistor having an emitter, collector and base terminal;
said first and second terminals including selected ones of said transistor terminals, and said interrupting means including a path through said transistor;
said one cell, when in said first condition, biasing said transistor into an appreciable conducting state through said path;
and when in said second condition biasing said transistor into a substantially blocking state through said path.

6. A rechargeable battery assembly as set forth in claim 3, wherein:
said switching element comprises a transistor having an emitter, collector and base terminal;
said first and second terminals being said base and emitter terminals, and said interrupting means including the path across the emitter-to-collector junction of said transistor;
said one cell furnishing the base current of said transistor;
said one cell, when in said first condition, furnishing sufficient base current to bias the discharge current path including said emitter-to-collector junction into an appreciable conducting state;
said one cell when in said second condition lowering said base current sufficiently to cut off the portion of said discharge current path including said emitter-to-collector junction.

7. A rechargeable battery assembly as set forth in claim 1, wherein:
said sensing means comprises a transistor having an emitter, collector and base terminal;
said base and emitter terminals circuit connected to the electrodes of said one cell, and the discharge current path of said plurality of cells including the base-to-collector junction of said transistor;
said one cell furnishing the base current of said transistor;
said one cell, when in said first condition, furnishing sufficient base current to bias the discharge current path including said emitter-to-collector junction into an appreciable conducting state;
said one cell when in said second condition lowering said base current sufficiently to cut off the portion of said discharge current path including said emitter-to-collector junction;
whereby the discharge of all of said plurality of cells is interrupted responsive to said one cell approaching its reverse polarity condition.

8. A rechargeable battery assembly, as set forth in claim 7, including:
a charging current path for restoring the charge on said plurality of cells;
said charging current path including circuit means for bypassing the emitter-to-collector junction of said transistor.

9. A rechargeable battery assembly, as set forth in claim 8, wherein:
said circuit means including a undirectional circuit element appropriately biased for offering appreciable resistance to the flow of current in a direction corresponding to a discharge current flow;
but offering negligible resistance to the flow of current in an opposite direction, corresponding to said charging current path.

10. A rechargeable battery assembly, as set forth in claim 8, wherein:
said circuit means includes the collector-to-emitter junction of said transistor;
said charging current means forward biasing said collector-to-emitter junction to offer negligible resistance to the flow of current therethrough in a direction corresponding to the charging of said plurality of cells.

11. A rechargeable battery assembly as set forth in claim 1, further including:
auxiliary means circuit connected to said one cell for discharging said one cell towards said second condition before any of the other of said plurality of cells approach said second condition.

12. A rechargeable battery assembly as set forth in claim 11, further including:
said auxiliary means including an adjustable circuit element;
said adjustable circuit element preselectively adjusted in operative relationship to the discharge drain of said cells to said external circuit, and the charge capacity of said one cell for causing the charge capacity of said one cell to approach said second condition before any of the other of said plurality of cells.

13. A rechargeable battery assembly comprising:
a plurality of individual cells, electrically connected together to combinedly discharge into an external circuit;
individual ones of said cells having a positive and cooperating negative electrode, with said negative electrode having a greater charge capacity than said positive electrode;
said cells being subject to charging with reverse polarity in response to full discharge of said positive electrode by discharging current;

one of said cells predeterminedly selected to approach said reverse polarity condition before any of the other of said cells;

said one cell having a first condition corresponding to an appreciable positive charge;

and a second condition corresponding to the approaching of said reverse polarity condition;

a switching element in a sensing circuit path having first and second terminals electrically connected to the positive and negative electrodes of said one cell;

said one cell, when in said first condition, presenting a positive potential, above a predetermined magnitude, between said first and second terminals;

said one cell, when in said second condition, presenting a lesser potential between said first and second terminals;

said switching element having a first state as determined by the potential to said first and second terminals being above said predetermined magnitude, and corresponding to said one cell being in said first condition;

and a second state as determined by said potential being at said lesser value, and corresponding to said one cell being in said second condition;

said sensing circuit path including an additional element in circuit with said switching element;

said switching element and additional element receiving predetermined partial portions of the potential applied to said first and second terminals, whereby said switching element switches to said second state corresponding to a predetermined partial portion of said lesser potential being applied thereto;

said switching element including interrupting means circuit connected in the discharge current path of said plurality of cells, for interrupting said discharge current flow responsive to the switching of said switching element to said second state;

whereby the discharge of all of said plurality of cells is interrupted responsive to said one cell approaching its reverse polarity condition.

14. A rechargeable battery assembly comprising:

a plurality of individual cells, electrically connected together to combinedly discharge into an external circuit;

individual ones of said cells having a positive and cooperating negative electrode, with said negative electrode having a greater charge capacity than said positive electrode;

said cells being subject to charging with reverse polarity in response to full discharge of said positive electrode by discharging current;

one of said cells predeterminedly selected to approach said reverse polarity condition before any of the other of said cells;

said one cell having a first condition corresponding to an appreciable positive charge;

and a second condition corresponding to the approaching of said reverse polarity condition;

a switching element in a sensing circuit path having first and second terminals electrically connected to the positive and ngeative electrodes of said one cell;

said one cell, when in said first condition presenting a positive potential, above a predetermined magnitude, between said first and second terminals;

said one cell, when in said second condition presenting a lesser potential between said first and second terminals;

said switching element having a first state as determined by the potential said first and second terminals being above said predetermined magnitude, and corresponding to said one cell being in said first condition;

and a second state as determined by said potential being at said lesser value, and corresponding to said one cell being in said second condition;

said switching element comprises a transistor having an emitter, collector and base terminal;

said sensing circuit path including an additional element in circuit with selected ones of said transistor terminals;

said selected ones of said transistor terminals and said additional element both receiving a predetermined partial portion of the potential applied to said first and second terminals, whereby said transistor switches to said second state corresponding to a first predetermined partial portion of said lesser potential being applied thereto;

said switching element including interrupting means circuit connected in the discharge current path of said plurality of cells, for interrupting said discharge current flow responsive to the switching of said switching element to said second state;

whereby the discharge of all of said plurality of cells is interrupted responsive to said one cell approaching its reverse polarity condition;

said selected terminals being the base and emitter terminals of said transistor, and said interrupting means including the path across the emitter-to-collector junction of said transistor;

said one cell furnishing the base current of said transistor;

said one cell, when in said first condition, furnishing sufficient base current to bias the discharge current path including said emitter-to-collector junction into an appreciable conducting state;

said one cell, when in said second condition applying said first predetermined partial portion to said base and emitter terminals;

said first predetermined partial portion of a value to lower the base current of said transistor sufficiently to cut off the portion of said discharge current path including said emitter-to-collector junction.

15. A rechargeable battery assembly as set forth in claim 14, wherein:

said additional element being a forward biased diode junction, in series circuit with the base-to-emitter junction of said transistor;

said diode junction having a predetermined portion of the potential of said one cell;

with said base-to-emitter junction having a remainder portion of said potential of said one cell;

said remainder portion approaching said first predetermined partial value corresponding to transistor cut-off, with said one cell being at said second condition;

the magnitude of the potential of said one cell when in said second condition, appreciably operates the said first predetermined partial value applied to said base-to-emitter junction.

16. In a rechargeable sealed alkaline battery, one cell having at least one positive electrode and a cooperating negative electrode of larger charge capacity;

said one cell constituting one of a cell-series comprising a plurality of similar serially connected cells each of which has greater positive charge capacity than said one cell positive electrode;

whereby a discharge of said cell series into a load causes said one cell to approach a fully discharge state before the other cells of said cell series, and continuing discharge of said cell series into the load, subjecting said one cell to reverse charging;

means for sensing the condition of said one cell and interrupting the discharging of said cell series responsive to said one cell approaching said fully discharged state.

17. In a rechargeable sealed alkaline battery, one cell having at least one positive electrode and a cooperating negative electrode of larger charge capacity;

said one cell constituting one of a cell-series comprising a plurality of similar serially connected cells each of which has greater positive charge capacity than said one cell positive electrode;

whereby a discharge of said cell series into a load causes said one cell to approach a fully discharged state before the other cells of said cell series, and continuing discharge of said cell series into the load, subjecting said one cell to reverse charging;

said one cell having a first condition corresponding to an appreciable positive charge;

and a scond condition corresponding to the approaching of said reverse polarity condition;

a switching element having a first terminal electrically connected to the positive electrode of said one cell, and a second terminal electrically connected to the negative electrode of said one cell;

said one cell, when in said first condition presenting a positive potential, above a predetermined magnitude between said first and second terminals;

said one cell, when in said second condition presenting a lesser potential between said first and second terminals;

said switching element having a first state as determined by the potential said first and second terminals being above said predetermnied magnitude, and corresponding to said one cell being in said first condition;

and a second state as determined by said potential being at said lesser value, and corresponding to said one cell being in said second condition;

said switching element including interrupting means circuit connected in the discharge current path of said plurality of cells, for interrupting said discharge current flow responsive to the switching of said switching element to said second state;

whereby the discharge of all of said plurality of cells is interrupted responsive to said one cell approaching its reverse polarity condition.

18. In a rechargeable sealed alkaline battery cell, as set forth in claim 17, wherein:

said switching element comprises a transistor having an emitter, collector and base terminal;

said first and second terminals including selected ones of said transistor terminals, and said interrupting means including a path through said transistor;

said one cell, when in said first condition, biasing said transistor into an appreciable conducting state through said path;

and when in said second condition biasing said transistor into a substantially blocking state through said path.

19. In a rechargeable sealed alkaline battery cell, as set forth in claim 17, wherein:

said sensing means comprises a transistor having an emitter, collector and base terminal;

said base and emitter terminals circuit connected to the electrodes of said one cell, and the discharge current path of said plurality of cells including the base-to-collector junction of said transistor;

said one cell furnishing the base current of said transistor;

said one cell, when in said first condition, furnishing sufficient base current to bias the discharge current path including said emitter-to-collector junction into an appreciable conducting state;

said one cell when in said second condition lowering said base current sufficiently to cut off the portion of said discharge current path including said emitter-to-collector junction;

whereby the discharge of said cell series is interrupted responsive to said one cell approaching its reversed polarity condition.

References Cited by the Examiner
UNITED STATES PATENTS

| | | | |
|---|---|---|---|
| 3,189,788 | 6/1965 | Cady | 315—129 |
| 3,221,239 | 11/1965 | Langer et al. | 320—17 |
| 3,234,538 | 2/1966 | Parke | 324—29.5 X |
| 3,258,670 | 6/1966 | Piechon | 320—6 |

JOHN F. COUCH, *Primary Examiner.*

S. WEINBERG, *Assistant Examiner.*